United States Patent
Covens et al.

(10) Patent No.: US 12,455,282 B2
(45) Date of Patent: Oct. 28, 2025

(54) METHOD AND SYSTEM FOR MEASURING ANALYTE CONCENTRATION IN A SAMPLE

(71) Applicant: miDiagnostics NV, Heverlee (BE)

(72) Inventors: Kris Covens, Leuven (BE); Sarp Kerman, Leuven (BE); Willem Van Roy, Leuven (BE)

(73) Assignee: miDiagnostics NV, Heverlee (BE)

( * ) Notice: Subject to any disclaimer, the term of this patent is extended or adjusted under 35 U.S.C. 154(b) by 925 days.

(21) Appl. No.: 17/636,842

(22) PCT Filed: Aug. 21, 2020

(86) PCT No.: PCT/EP2020/073504
§ 371 (c)(1),
(2) Date: Feb. 18, 2022

(87) PCT Pub. No.: WO2021/037725
PCT Pub. Date: Mar. 4, 2021

(65) Prior Publication Data
US 2022/0299503 A1  Sep. 22, 2022

(30) Foreign Application Priority Data
Aug. 23, 2019 (EP) .................................... 19193422

(51) Int. Cl.
*G01N 33/543* (2006.01)
*G01N 33/58* (2006.01)

(52) U.S. Cl.
CPC ........... *G01N 33/543* (2013.01); *G01N 33/58* (2013.01)

(58) Field of Classification Search
CPC .............................. G01N 33/543; G01N 33/58
See application file for complete search history.

(56) References Cited

U.S. PATENT DOCUMENTS

2006/0003320 A1   1/2006  Miller et al.
2013/0078738 A1*  3/2013  Watanabe ............ G01N 33/585
                                                          436/501

FOREIGN PATENT DOCUMENTS

EP      2574927 A1      4/2013
WO   2017/001534 A1    1/2017

OTHER PUBLICATIONS

Roche, P.J.R., et al., Multiple surface plasmon biosensor assay as new tool for probing metabolic evaluation of CYP2D6, Sensors and Actuators B: Chemical, 2009, vol. 139, pp. 74-82.
Rupert, D.L.M., et al., Determination of Exosome Concentration in Solution Using Surface Plasmon Resonance Spectroscopy, Analytical Chemistry, May 22, 2014, vol. 86, No. 12, pp. 5929-5936.

* cited by examiner

*Primary Examiner* — Narayan K Bhat
(74) *Attorney, Agent, or Firm* — Hodgson Russ LLP (57) ABSTRACT

There is provided a method and a system for measuring analyte concentration in a sample. The sample is provided to a microfluidic channel. A surface of the microfluidic channel is provided with affinity probes for binding the analyte to the surface. A signal which is indicative of the binding of the analyte to the affinity probes is measured temporally. The temporally measured signal is then analyzed to determine a pseudo-rate constant which is indicative of how fast the temporally measured signal changes with time. The analyte concentration in the sample is determined by comparing the determined pseudo-rate constant to a predetermined relationship which relates pseudo-rate constants to analyte concentrations.

21 Claims, 7 Drawing Sheets

METHOD AND SYSTEM FOR MEASURING ANALYTE CONCENTRATION IN A SAMPLE

TECHNICAL FIELD

The present disclosure relates to the field of measuring analyte concentration in a sample using affinity-based assays.

BACKGROUND

Affinity-based assays may be used to measure the concentration of an analyte of interest in a sample. Such assays include a single or multiple steps where the analyte of interest binds to specific affinity probes, such as antibodies, nanobodies, or aptamers. The binding reactions may be measured using various techniques including colorimetry or fluorescence. The amplitude of the measured signal may be used for quantification of the concentration of the analyte of interest. However, in case of an irreproducibility in the system concerning the ratio between the measured signal and the concentration, it is not reliable to directly translate the amplitude of the signal to the analyte concentration.

Conventionally, calibration is carried out by measuring one or more calibration samples with a known concentration of the analyte of interest to generate a calibration curve. Using the calibration curve, the concentration of the analyte in a sample may be determined. Such calibration samples are easily available in centralized testing laboratories, where they can be prepared and stored under controlled conditions. However, in a point-of-care or over-the-counter tests, the shelf life and storage conditions are not well controlled. Hence the calibration samples can degrade over time, and their active concentration may become unknown. There is thus room for improvements.

SUMMARY

Example embodiments provide a method of measuring analyte concentration in a sample. The method comprises providing the sample to a microfluidic channel, wherein a surface of the microfluidic channel is provided with affinity probes for binding the analyte to the surface, and temporally measuring a signal which is indicative of the binding of the analyte to the affinity probes. The temporally measured signal is then analyzed to determine a pseudo-rate constant which is indicative of how fast the temporally measured signal changes with time, and the analyte concentration in the sample is determined by comparing the determined time constant to a predetermined relationship which relates pseudo-rate constants to analyte concentrations.

BRIEF DESCRIPTIONS OF THE DRAWINGS

The above, as well as additional objects, features and advantages, will be better understood through the following illustrative and non-limiting detailed description of embodiments described herein, with reference to the appended drawings, where the same reference numerals will be used for similar elements, wherein.

DETAILED DESCRIPTION

I. Overview

In view of the above, it is an object to provide an improved method and system for measuring analyte concentration in a sample. In particular, it is an object to provide a method and system for measuring analyte concentration in a sample which do not require storage of calibration samples with a known concentration.

According to a first aspect, there is provided a method of measuring analyte concentration in a sample, comprising:

providing the sample to a microfluidic channel, wherein a surface of the microfluidic channel is provided with affinity probes for binding the analyte to the surface, temporally measuring a signal which is indicative of the binding of the analyte to the affinity probes, analyzing the temporally measured signal to determine a pseudo-rate constant which is indicative of how fast the temporally measured signal changes with time, and determining the analyte concentration in the sample by comparing the determined pseudo-rate constant to a predetermined relationship which relates pseudo-rate constants to analyte concentrations.

With this method, temporal information—expressed in terms of a pseudo-rate constant—of the temporally measured signal is used instead of the amplitude of the temporally measured signal to quantify the analyte concentration. While the amplitude of the temporally measured signal is typically sensitive to irreproducibility in the measurement set-up, it has been found that this is not the case for pseudo-rate constants. Accordingly, using the proposed method, calibration using calibration samples need not be performed for each and every measurement set-up. Instead, a predetermined relationship which relates pseudo-rate constants to analyte concentrations may be determined once and used for several measurement set-ups. As will be explained later, the predetermined relationship may be determined theoretically or experimentally.

The pseudo-rate constant generally indicates how fast the temporally measured signal changes with time after provision of the sample. The pseudo-rate constant may correspond to a parameter of a parametric function which describes how fast the temporally measured signal changes with time. The parameter may generally describe how fast the parametric function changes with time. The parameter may correspond to the inverse of the time it takes for the parametric function to reach a certain percentage from its original to its final, asymptotic, value. By way of example, when the temporally measured signal is an increasing exponential signal, the pseudo-rate constant may be the inverse of time for the temporally measured signal to reach 1-1/e from its original to its final, asymptotic, value. When the temporally measured signal is a decreasing exponential signal, the pseudo-rate constant may be the inverse of the time for the temporally measured signal to decay by 1/e from its original to its final, asymptotic, value.

An affinity-based assay is a generic term for a range of methods utilizing affinity reagents or probes that allow the determination of the concentration for specific analytes. The analytes may for example be biomarkers predictive of certain diseases. The affinity probes are generally molecules that bind to a specific target molecule. The affinity probes may include at least one of antibodies, antigens, receptors, aptamers, nucleic acids, and molecularly imprinted polymers. The affinity probes may be selected based on which analyte is to be analyzed.

The temporally measured signal is typically measured in real time. In order to achieve a real time measurement, a surface sensitive technique may be used to perform at least one of causing generation of the signal and collecting the signal. A surface sensitive technique only interacts with the sample in the vicinity of the surface of the microfluidic channel where the affinity probes bind the analyte. In this way, the surface sensitive technique serves to isolate the signal from the surface and suppress the bulk signal from the rest of the sample. By using a surface sensitive techniques, one may avoid washing away the sample from the microfluidic channel prior to generating or collecting the signal.

An evanescent technique may be used to perform at least one of causing generation of the signal and collecting the signal. In particular, an evanescent optical technique, i.e., which operates in the visible, ultraviolet or infrared portion of the electromagnetic spectrum, may be used. An evanescent technique is an example of a surface sensitive technique, and hence only interacts with the sample in the vicinity of the surface of the microfluidic channel where the affinity probes bind the analyte. In this way, one may avoid washing away the sample from the microfluidic channel prior to generating or collecting the signal. Other surface sensitive techniques are also possible, e.g., techniques which measure the signal close to the surface by using mass sensors, electrical sensors, or magnetic sensors.

As an example of an evanescent technique, a waveguide arranged adjacent to the surface may be used to perform at least one of causing generation of the signal by subjecting the surface of the microfluidic channel to light carried by the waveguide and collecting the signal from the microfluidic channel. Other evanescent optical techniques are also possible, such as total internal reflection and plasmonics.

As an alternative or complement to surface sensitive techniques, real time measurements suppressing the background may also be achieved using other techniques, such as by using the time-resolved amplified cryptate emission (TRACE) technique, also known as TR-FRET (described in Bereciartua, E. "Trace technology for Assays of Novel Biomarkers", EJIFCC, 21(4): 118-121, January 2011) or regular FRET or fluorescence anisotropy/polarization based assays.

The temporally measured signal may be analyzed by fitting a parametric function to the temporally measured signal, wherein the pseudo-rate constant is determined as a parameter of the parametric function. The parameter of the parametric function may be related to how fast the parametric function increases or decreases. In this way, the pseudo-rate constant of the temporally measured signal reflecting the binding reactions may be determined in a simple and computationally efficient way.

By way of example, the parametric function may be an exponential function. An exponential function is found to be a good model for the kinetics of first-order binding reactions.

As explained above, the analyte concentration is determined from the pseudo-rate constant and a predetermined relationship which relates pseudo-rate constants to analyte concentrations. The pseudo-rate constant may be related to the analyte concentration according to the predetermined relationship. For example, the pseudo-rate constant may be proportional to the analyte concentration.

The binding of the analyte to the surface may be determined by a first order association reaction. In such case, the pseudo-rate constant may be related to a product of the analyte concentration and an association rate constant of the first order association reaction according to the predetermined relationship plus a dissociation rate constant. The association rate constant may be an effective association rate constant which takes into account additional effects such as mass transport effects, temperature or viscosity dependencies, competitive interactions, positive or negative cooperativity, or other rate-limiting effects. If the effective association rate constant is known, it may be possible to theoretically determine the predetermined relationship. For example, the pseudo-rate constant may be determined to be equal to the product of the analyte concentration and the effective association rate constant.

If the effective association rate constant is not known, the predetermined relationship may instead be determined experimentally. For example, the predetermined curve may be obtained through analyzing the temporal signal of a plurality of calibration samples, each with different and known analyte concentrations.

The time until the affinity probes are saturated by the analyte, causing the temporally measured signal to flatten out, depends on the analyte concentration in the sample. The higher the concentration, the shorter the time until saturation of the affinity probes. In a point-of-care or over-the-counter tests, it is desirable that the result of the test is delivered within a certain period of time. It is hence advantageous if the analyte concentration in the sample and/or the (effective) association rate constant is sufficiently high to approach saturation of the affinity probes within a predetermined time from the providing of the sample. The predetermined time may for instance be one or more minutes, such as 1, 2, 3, 4, 5, 10 or 15 minutes. The predetermined time may also be less than a minute, such as 30 s. If the analyte concentration and/or the (effective) association rate constant is sufficiently high (i.e., if the temporally measured signal has flattened out within a predetermined time), the pseudo-rate constant may be determined from the temporally measured signal up until the predetermined time, e.g., by fitting a parametric function as explained above.

In practice, it could happen that the temporally measured signal reaches probe saturation too rapidly to measure in an actual sample. In such cases the pseudo-rate constant cannot be determined. However, it is still possible to determine that the pseudo-rate constant is below a shortest pseudo-rate constant that can be determined, and that the concentration is higher than the value corresponding to the shortest pseudo-rate constant that can be determined according to the predetermined relationship.

If the analyte concentration in the sample and/or the (effective) association rate constant is not sufficiently high to approach saturation of the affinity probes within a predetermined time from providing the sample (i.e., if the temporally measured signal has not started to flatten out within a predetermined time) further measures may be taken to allow the pseudo-rate constant to be determined. More specifically, the method may further comprise adding a spike of the analyte, or a reagent substantially similar to the analyte, to the sample after the predetermined time, to saturate the affinity probes. In other words, an amount of the analyte (or a reagent substantially similar to the analyte) which is high enough to cause saturation of the affinity probes may be added to the sample after the predetermined time. The reagent substantially similar to the analyte is a reagent that mimics the analyte. In particular it mimics the binding kinetics of the analyte. The spiking of the analyte will cause the temporally measured signal to immediately reach the value corresponding to saturated affinity probes. Depending on the measurement principle used, this may be the maximum or the minimum value of the temporally measured signal. The pseudo-rate constant of the spike in reaction may then be determined based on the temporally measured signal, for example by fitting a parametric function in analogy with discussions herein wherein the anlyte concentration in the sample is sufficiently high to approach saturation of the affinity probes within a predetermined time from the providing of the sample. Once this parametric function in determined, the theoretical inital slope of the association of the spiked in analyte, i.e. in case it would have been added without prior reaction of the actual sample, can be calculated. The following relationship may be considered:

$$\frac{[analyte\_in\_sample]}{[spike\_in\_reagent]} = \frac{measured\ initial\ slope}{calculated\ initial\ slope\ of\ spike}$$

In practice, one may check whether or not the concentration of the analyte and/or the (effective) association rate constant is high enough by considering the slope of the temporally measured signal. In the beginning, the slope of the temporally measured signal is typically constant, i.e., the temporally measured signal follows a straight line. However, after a while the slope of the temporally measured signal starts to change, meaning that the temporally measured signal starts to deviate from following a straight line. If the slope of the temporally measured signal has started to change within the predetermined time, it is possible to extract the pseudo-rate constant. Otherwise, the spiking technique described above may be used.

The signal may originate from optical effects, such as luminescence (emission of light) or colorimetry (transmission of light). Accordingly, the signal may be measured by, for example, using colorimetric or fluorescence techniques. Colorimetric techniques may include detection of shift in wavelength (e.g., of a maximum or minimum in the transmission spectrum), or a change in transmission at a fixed wavelength.

According to a second aspect, there is provided a system for measuring analyte concentration in a sample, comprising:
  a microfluidic device including a microfluidic channel arranged to receive the sample, wherein a surface of the microfluidic channel is provided with affinity probes for binding the analyte to the surface,
  a detector arranged to temporally measure a signal which is indicative of the binding of the analyte to the affinity probes, and
  a processing device arranged to:
    analyze the temporally measured signal to determine a pseudo-rate constant which is indicative of how fast the temporally measured signal changes with time, and
    determine the analyte concentration in the sample by comparing the determined pseudo-rate constant to a predetermined relationship which relates pseudo-rate constants to analyte concentrations.

The detector may be a surface sensitive detector.

The system may further comprise a waveguide arranged adjacent to the surface of the microfluidic channel, the waveguide being arranged to perform at least one of causing generation of the signal by subjecting the surface of the microfluidic channel to light carried by the waveguide and collecting the signal from the microfluidic channel.

The microfluidic device may be a microfluidic chip.

According to a third aspect, there is provided a diagnostic device comprising the system of the second aspect.

The second and third aspects may generally have the same features and advantages as the first aspect. It is further noted that the inventive concepts relate to all possible combinations of features unless explicitly stated otherwise.

II. Example Embodiments

Example embodiments will now be described more fully hereinafter with reference to the accompanying drawings. The inventive concepts may, however, be embodied in many different forms and should not be construed as limited to the embodiments set forth herein; rather, these embodiments are provided for thoroughness and completeness, and fully convey the scope of the inventive concepts to the skilled person.

Figure 1:
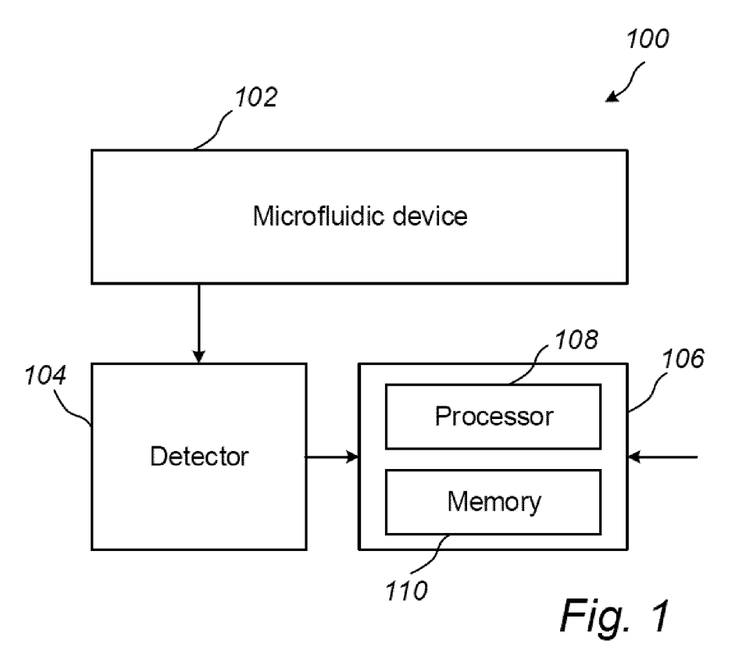
FIG. 1 schematically illustrates a system for measuring analyte concentration in a sample according to embodiments.

FIG. 1 illustrates a system 100 for measuring analyte concentration in a sample. The system 100 comprises a microfluidic device 102, a detector 104, and a processing device 106. The system 100 may for example be included in a diagnostic device which is arranged to draw conclusions regarding a medical condition on basis of the measured analyte concentration.

The microfluidic device 102 may be arranged to receive a sample, and perform an affinity-based assay on the sample to determine the concentration of an analyte of interest. The sample may for example be a body fluid, such as blood, plasma, urine, saliva, and the analyte may be a biomarker predictive of a disease. The sample may also be a specimen used for research purposes, such as a cell culture medium. The microfluidic device 102 may be a microfluidic chip, such as a silicon or plastic chip.

Figure 2A:
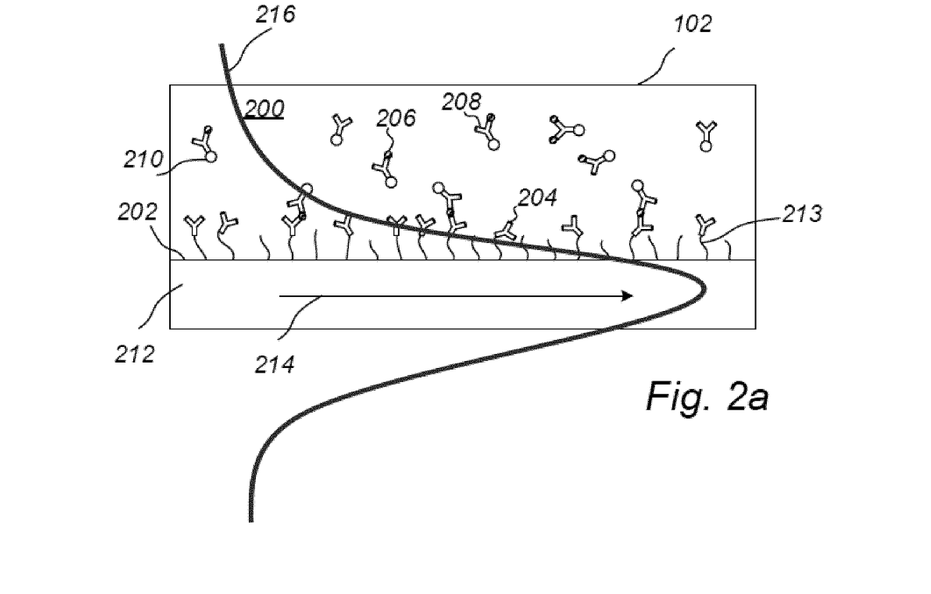
FIG. 2a schematically illustrates a microfluidic device which includes a microfluidic channel arranged adjacent to a waveguide according to embodiments. An affinity-based assay of sandwich type is illustrated.
Figure 2B:
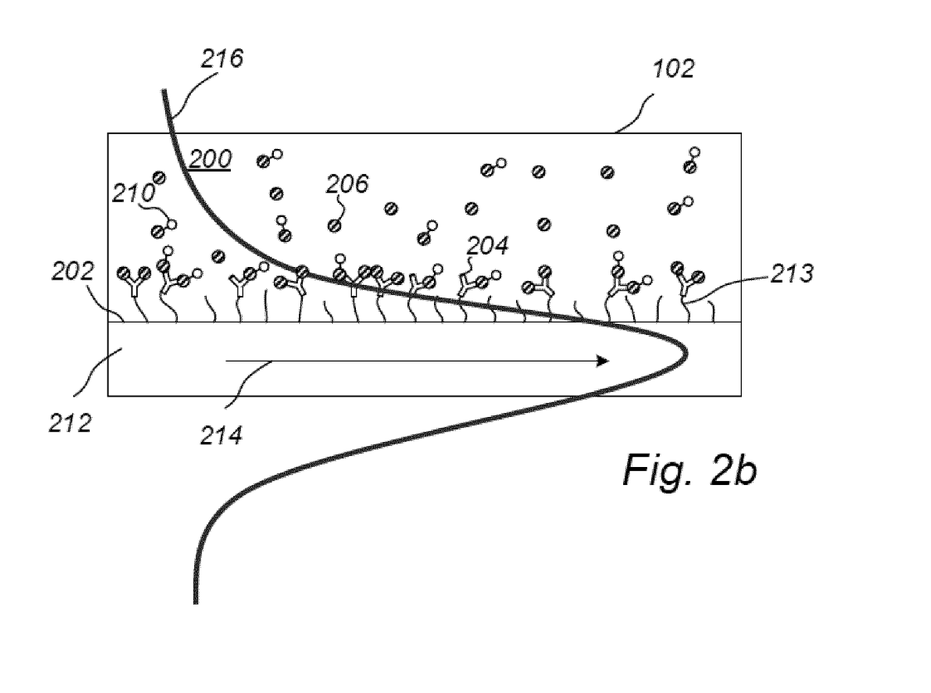
FIG. 2b schematically illustrates a microfluidic device which includes a microfluidic channel arranged adjacent to a waveguide according to embodiments. An affinity-based assay of competitive type is illustrated.

As further illustrated in FIG. 2a and FIG. 2b, the microfluidic device 102 includes a microfluidic channel 200. A surface 202 of the microfluidic channel 200 is provided with affinity probes 204. The affinity probes 204 may also be referred to as affinity reagents or capture antibody. The affinity probes 204 may be attached to the surface 202 using a linker 213, or may be attached directly on the surface 202.

For example, the affinity probes 204 may be deposited or physisorbed on the surface 202. The affinity probes 204 are selected such that an analyte of interest 206 binds to the affinity probes 204. Depending on the application at hand, i.e., which analyte is to be analyzed, the affinity probes 204 may include antibodies, antigens, receptors, aptamers, nucleic acids, or molecularly imprinted polymers. In the illustrated examples of FIG. 2a and FIG. 2b, the affinity probes 204 are antibodies.

The binding reactions of the analyte 206 to the affinity probes 204 are measured temporally by the detector 104. The detector 104 may generally implement any technique by which the binding reactions may be detected and measured as known in the art. Such techniques may rely on optical effects, such as luminescence or colorimetry. Generally, luminescence deals with detecting an emitted light signal which is indicative of the binding of the analyte 206 to the affinity probes 204, such as a fluorescence signal, a chemiluminescence signal, or a bioluminescence signal. Colorimetry instead deals with detecting the transmission of light due to the binding of the analyte 206 to the affinity probes 204, for example by detecting a shift in wavelength (e.g., of a maximum or minimum in the transmission spectrum) or a change in transmission at a fixed wavelength. Common to these techniques is however that a signal which is indicative of the binding of the analyte 206 to the affinity probes 204 is measured. In the examples of FIG. 2a and FIG. 2b, a fluorescence technique is used.

FIG. 2a illustrates an affinity-based assay of sandwich type. For example, this may be a sandwich immunoassay. In more detail, the sample is provided with further affinity probes 208 to which a fluorophore 210 is bound. The further affinity probes 208 are selected such that the analyte of interest 206 binds to them. The further affinity probes 208 are here illustrated by further antibodies 208, referred to herein as detector antibodies. The analyte 206 may thus bind to the further affinity probes 208. In that way, the analyte 206 will be marked by the fluorophore 210. The analyte 206 marked by the fluorophore 210 may then bind into the affinity probes 204 arranged at the surface 202. By subjecting the analyte 206 marked by the fluorophore 210 that has bound to the affinity probes 204 arranged at the surface 202 to light, a fluorescence signal will be emitted which is indicative of the binding of the analyte 206, marked by the fluorophore 210, to the affinity probes 204. The fluorescence signal will be directly proportional to the concentration of the analyte 206 because the further antibodies 208 will not bind if the analyte 206 is not present in the sample. That fluorescence signal may be detected by the detector 104.

FIG. 2b illustrates an affinity-based assay of competitive type. For example, this may be a competitive immunoassay. In that case, the sample comprises analyte 206 which is either unlabeled or labeled by a fluorophore 210. The concentration of labeled analyte 208 may be the same regardless of the total concentration of analyte 206 in the sample. The unlabeled analyte competes with the labeled analyte to bind the affinity probes 208. In this case, the fluorescence signal will be indicative of the amount of labelled analyte which has bound to the affinity probes 208.

Figure 3A:
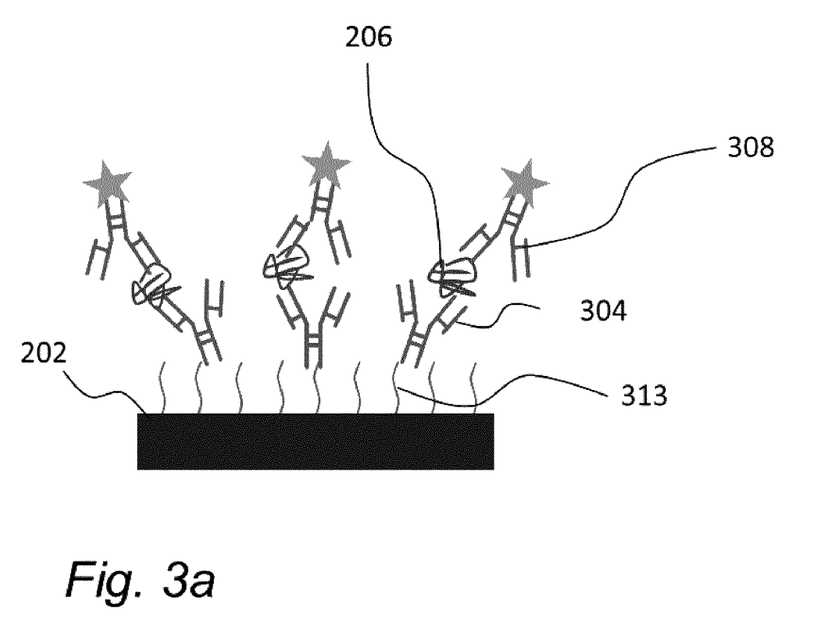
FIG. 3a schematically illustrates a sandwich immunoassay.
Figure 3B:
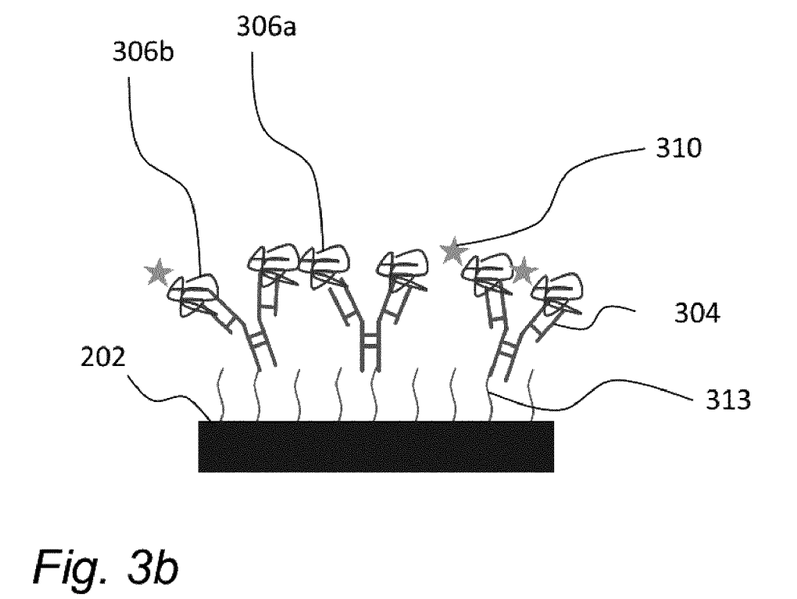
FIG. 3b schematically illustrates a competitive immunoassay.

With reference to FIG. 3a, a sandwich immunoassay format is further schematically illustrated and exemplified. The surface 202 of the microfluidic channel 200 is provided with affinity probes 204, in this example capture antibodies 304. The capture antibodies 304 are in the example attached to the surface 202 using a cross-linker 313, but they may alternatively be attached directly on the surface 202. The capture antibodies 304 are selected such that an analyte of interest 206, being an antigen in this example, binds to the affinity capture antibodies 304. Further illustrated are labeled detection antibodies 308, labelled with for example fluorescent labels. With reference to FIG. 3b, a competitive immunoassay format is schematically illustrated. The surface 202 of the microfluidic channel 200 is provided with affinity probes 204, in this example capture antibodies 304. The capture antibodies 304 are in the example attached to the surface 202 using a cross-linker 313, but they may alternatively be attached directly on the surface 202. The capture antibodies 304 are selected to bind an analyte 206, being an antigen 306 in this example, from a sample. The antigen 306 is either unlabeled antigen 306a or labeled antigen 306b, labeled by fluorophore 310. The unlabeled antigen 306a competes with the labeled antigen 306b to bind the capture antibodies 304.

In conventional affinity-based assays, such as immune-based assays, the sample is washed away prior to measuring the signal which is indicative of the binding reactions of the analyte 206 with the affinity probes 204. In the FIG. 2a example, the reason for doing so is to wash away the further affinity probes 208 to which a fluorophore 210 is bound which have not bound to the affinity probes 204 through the analyte 206, and which otherwise would contribute to the signal. In the FIG. 2b example, the reason for doing so is to wash away labeled analyte which has not bound to the affinity probes 204. In order to avoid the washing step, a surface sensitive technique may be used to generate the signal which is indicative of the binding reactions, and/or collecting the signal. In particular, an evanescent optical technique may be used. As shown in FIG. 2, a waveguide 212 may be arranged adjacent to the surface 202 of the microfluidic channel 200. For example, the microfluidic channel 200 may be arranged on the waveguide 212. As light 214 propagates in the waveguide 212, there will be an evanescent field 216 in the vicinity of the waveguide 212. The evanescent field 216 may cause generation of the signal which is indicative of the binding reactions, whether it be detected by luminescence or colorimetry. Alternatively, or additionally, the waveguide 212 may be used to collect the generated signal and provide it to the detector 104. In the example of FIG. 2, such an evanescent field may cause the fluorophore 210 to emit a fluorescence signal. Since the evanescent field is spatially restrained to the vicinity of the waveguide 212, it will typically only interact with the fluorophore 210 that has bound to the surface 202 through the analyte 204 as an intermediary, and not with fluorophore 210 present in the sample further away from the surface 202.

The processing device 106 is arranged to analyze the temporally measured signal, and to determine the analyte concentration in the sample. The processing device 106 may be implemented in software, hardware, or a combination thereof. In a software implementation, the processing device 106 may include a processor 108 and a memory 110. The processor 108 may for example, be a central processing unit, a microprocessor, a digital signal processor, or similar. The memory 110, may be a non-transitory computer readable medium on which software instructions are stored. When executed by the processor 108, the software instructions may cause the processor 108 to analyze the temporally measured signal, and to determine the analyte concentration in the sample as will be further explained below.

In a hardware implementation, the processing device may comprise circuitry, such as one or more integrated circuits, a field programmable gate array or similar, designed for analyzing the temporally measured signal, and determining the analyte concentration in the sample.

Figure 4:
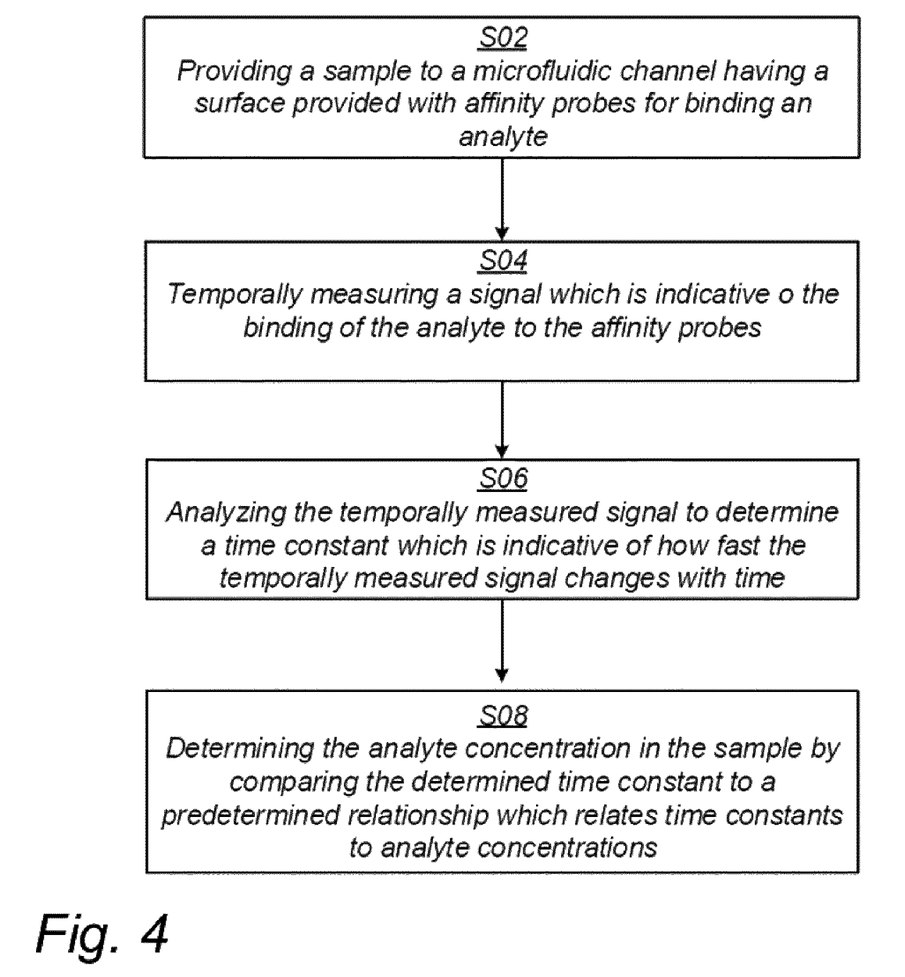
FIG. 4 is a flow chart of a method of measuring analyte concentration in a sample according to embodiments.

The operation of the system 100 will now be described with reference to FIG. 1, FIG. 2, and the flowchart of FIG. 4.

In step S02, a sample is provided to the microfluidic channel 200 of the microfluidic device 102, e.g., via an inlet at one of the ends of the microfluidic channel 200. As the sample is provided to the microfluidic channel 200, it will flow in the channel. The flow may e.g. be pressure driven, displacement driven, capillary driven, or electrokinetic driven.

In step S04, a signal which is indicative of the binding of the analyte to the affinity probes is measured using the detector 104. As explained above, the detector 104 may use colorimetric or luminescence-based techniques for this purpose. In order to cause the signal to be generated, and/or in order to collect the signal, evanescent techniques may be used. For example, light may be provided to the waveguide 212, thereby giving rise to an evanescent field which causes the signal to be generated. Additionally, or alternatively, the waveguide 212 may be used to collect the generated signal.

In step S06, the processing device 106 analyzes the temporally measured signal to determine a pseudo-rate constant which is indicative of how fast the temporally measured signal changes with time. By analyzing temporal information, conclusions regarding the reaction kinetics of the binding reactions of the analyte 206 to the affinity probes 204 may be drawn.

Figure 5A:
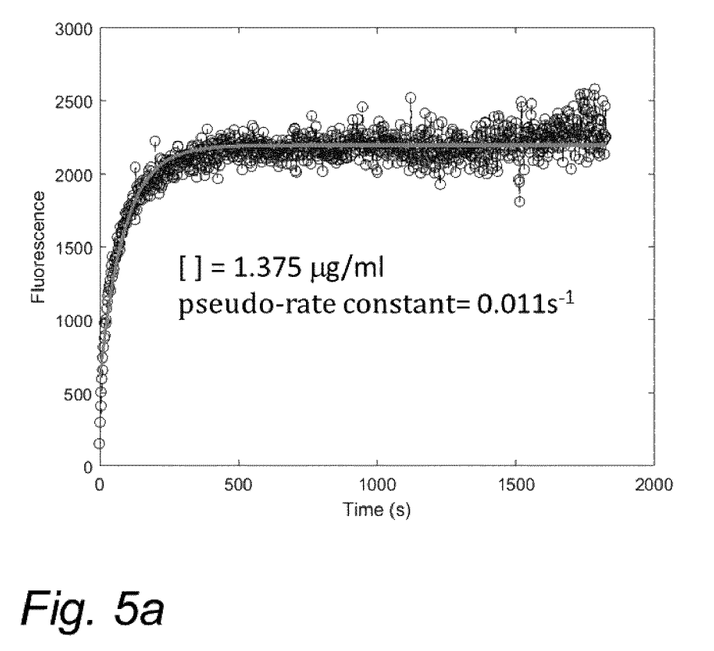
FIG. 5a illustrates a temporally measured signal which is indicative of a binding of an analyte in a sample to affinity probes.
Figure 5B:
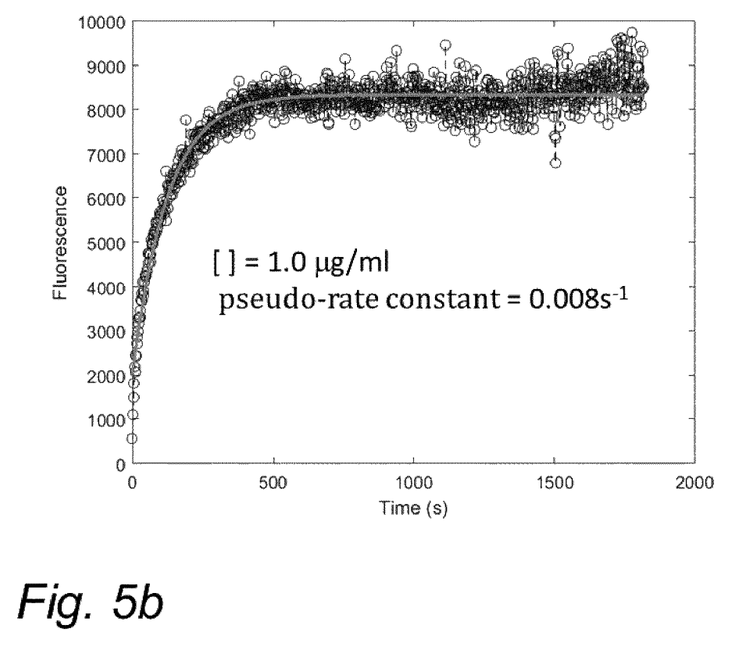
FIG. 5b illustrates a temporally measured signal which is indicative of a binding of an analyte in another sample to affinity probes.

FIG. 5a illustrates an example of what the temporally measured signal may look like. FIG. 5a is data from a competitive assay of C-reactive protein (CRP). The circles are the values of the temporally measured signal. The signal rapidly increases at the start of the binding reactions and reaches to a maximum in a matter of minutes in an exponential approach to equilibrium. More specifically, initially the temporally measured signal increases in a linear fashion, i.e., the rate of change is constant. After a while, the temporally measured signal starts to deviate from the linear increase, i.e., the rate of change starts to decrease. This means that the temporally measured signal gradually starts to flatten out. Asymptotically, the temporally measured signal reaches a maximum. The maximum is reached when the affinity probes 204 are saturated. FIG. 5b illustrates an example having a slower reaction kinetics as reflected by a slower increase of the temporally measured signal. FIG. 5b is also data from a competitive assay of C-reactive protein. The assays of FIG. 5a and FIG. 5b were carried out with the same concentration of labelled C-reactive protein, although the total concentration of C-reactive protein is different for the two assays.

In order to analyze the signal, the processing device 106 may fit a parametric function to the measured signal values. The fitting may be made following known procedures, such as applying a maximum likelihood estimation or a least squares estimation. For example, the parametric function may be an exponential function. The exponential function may have the following parametrization:

$$f(t) = y_0 + (y_{end} - y_0)\left(1 - e^{-\frac{t}{\tau}}\right) = y_0 + (y_{end} - y_0)\left(1 - e^{-kt}\right).$$

Here, $y_0$ is the value at t=0, $\gamma_{end}$ is the asymptotic maximum, $\tau$ is the time constant, and k is the pseudo-rate constant. When $t=\tau=1/k$, $f(t)=\gamma_0+(\gamma_{end}-\gamma_0)(1-1/e)$. The solid white curves in FIG. 5a and FIG. 5b illustrate an exponential function which has been fitted to the temporally measured signal. The estimated pseudo-rate constant is 0.011 s$^{-1}$ in the FIG. 5a example and 0.008 s$^{-1}$ in the FIG. 5b example.

In the parametric curve-fitting approach described above the pseudo-rate constant k, as well as the asymptotic maximum $\gamma_{end}$ end may be determined as long as the temporally measured signals starts to deviate from a straight line during a time period when the temporally signal is measured. If this is the case, one may say that the reaction is fast enough to allow the pseudo-rate constant to be determined. The reaction speed is related to the product of the total analyte concentration and the association rate constant of the reaction. Thus, the analyte concentration and/or the association rate constant may be said to be high enough to allow the pseudo-rate constant to be determined, if the temporally measured signal starts to significantly deviate from a straight line during the measurement period.

However, if the temporally measured signal does not start to deviate from a straight line during the measurement period, the asymptotic maximum $\gamma_{end}$ needs to be determined separately. For this purpose, the method may further comprise adding a spike of the analyte (or a reagent which is substantially similar to the analyte) to the sample after the predetermined time to saturate the affinity probes.

The adding a spike of the analyte, or a reagent which is substantially similar to the analyte, to the sample may be in combination with a sandwich type of assay.

The added spike of the analyte, or the reagent which is substantially similar to the analyte, will cause a quick saturation of the affinity probes, causing the temporally measured signal to take a sudden jump after the predetermined time to reach its final value. With this approach, the processing device 106, may estimate the parameter $\gamma_{end}$ from the value of the temporally measured signal after the predetermined time, and use the values of the temporally measured signals before the predetermined time to estimate the parameters $\gamma_0$ and k.

For a competitive assay, labelled competitor molecules, or labelled analytes, are used. Non-labelled analytes present in the sample are mixed with labelled competitor molecules before reaching affinity probes where analytes and competitor molecules compete to bind. For competitive assays, the concentration of unlabelled analytes may suitably be sufficiently high for the assay to reach near saturation throughout the assay, also for a lowest expected concentration of the unlabelled analytes. The competitor molecules may be labelled with fluorophores.

For a sandwich type of assay, the analyte and any spiked in analyte or reagent which is substantially similar to the analyte, may be labelled with a fluorophore or a detector antibody may be labelled with a fluorophore, prior to the sample being provided to the affinity probes.

Figure 6:
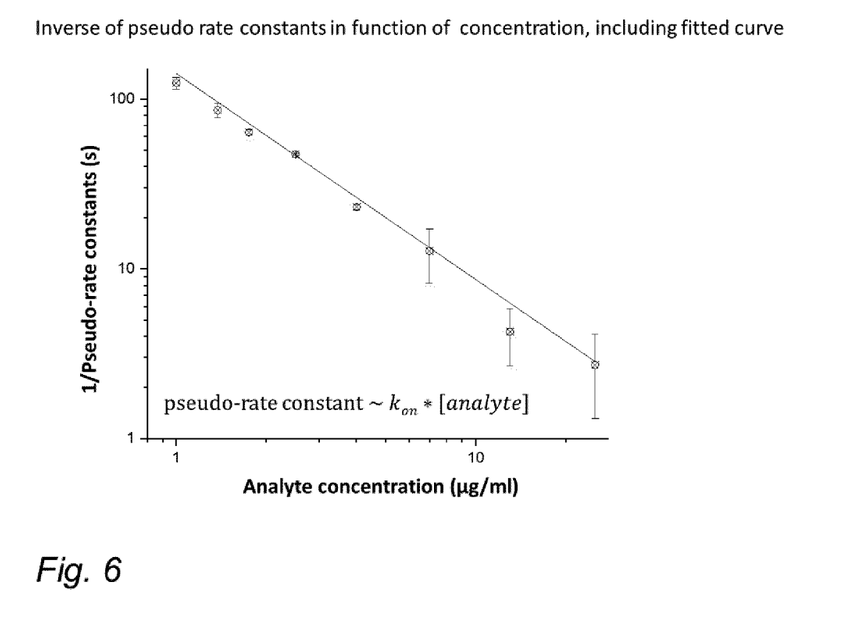
FIG. 6 illustrates a predetermined relationship which relates pseudo-rate constants to analyte concentrations.

In step S08, the processing device 106 proceeds to determine the analyte concentration in the sample by comparing the determined pseudo-rate constant to a predetermined relationship which relates pseudo-rate constants to analyte concentrations. The predetermined relationship may, for example, be stored in a memory of the processing device 106 or may be received by the processing device 106 from an external storage, such as a database. FIG. 6 shows an example of such a predetermined relationship. From the predetermined relationship, the processing device 106 may read off which analyte concentration corresponds to the estimated pseudo-rate constant.

As can be seen in FIG. 6, the pseudo-rate constant is typically related to the analyte concentration according to the predetermined relationship, i.e., the higher the concentration, the higher the pseudo-rate constant. The relationship may be a proportionality. In fact, it is known that when the binding reaction of the analyte with the affinity probes 204 is described by a first order association reaction, the pseudo-rate constant depends on two things, further understood from PAC, 1996, 68, 149. A glossary of terms used in chemical kinetics, including reaction dynamics (IUPAC Recommendations 1996), from DOI:10.1351/pac199668010149; and Pure and Applied Chemistry, Volume 53, Issue 3, Pages 753-771, from DOI: 10.1351/pac198153030753; hereby incorporated by reference. Firstly, the pseudo-rate constant depends on the concentration of the analyte. Secondly, the pseudo-rate constant depends on the association rate constant $k_{on}$ of the first order association reaction, where the association rate constant is an effective association rate constant which includes mass transport effects and other rate-limiting effects. In more detail, the pseudo-rate constant is related to the product of the association rate constant $k_{on}$ and the concentration of the analyte. For example, the pseudo-rate constant may be equal to said product.

In case the effective association rate constant is known, the predetermined relationship may be determined theoretically as the product of the effective association rate constant and the analyte concentration.

If the effective association rate constant is not known, the predetermined relationship may be determined experimentally by analyzing a plurality of calibration samples with different and known analyte concentrations. Notably, however, this does not have to repeated for each and every measurement set-up since the pseudo-rate constant, in contrast to the amplitude of the measured signal at saturation of the affinity probes, is not sensitive to small variations in the set-up, as long as the variations do not affect the effective rate association constant. For example, the disclosed approach is not sensitive to small variations in intensity of the light source, coupling efficiency of the light into the waveguide 212 and from the waveguide 212 to the detector 104, density of affinity probes 204 on the surface 202, and labeling efficiency (the percentage of analytes 206 being bound to a label, i.e., to a fluorophore 210). However, temperature and viscosity of the sample may still have an impact.

Figure 7A:
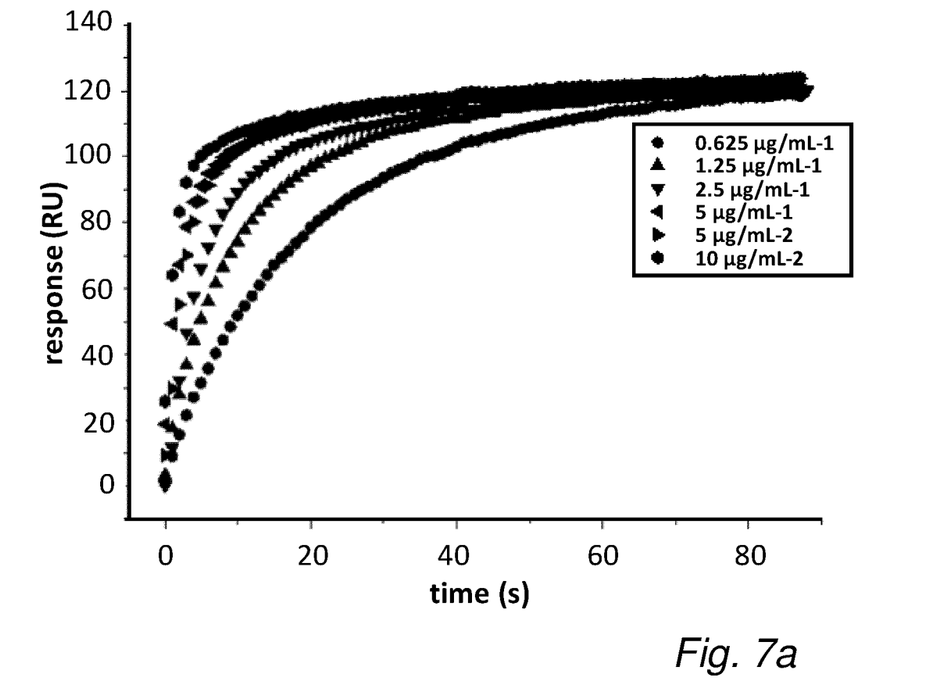
FIG. 7a illustrates a plurality of temporally measured signals corresponding to different samples of known concentration.
Figure 7B:
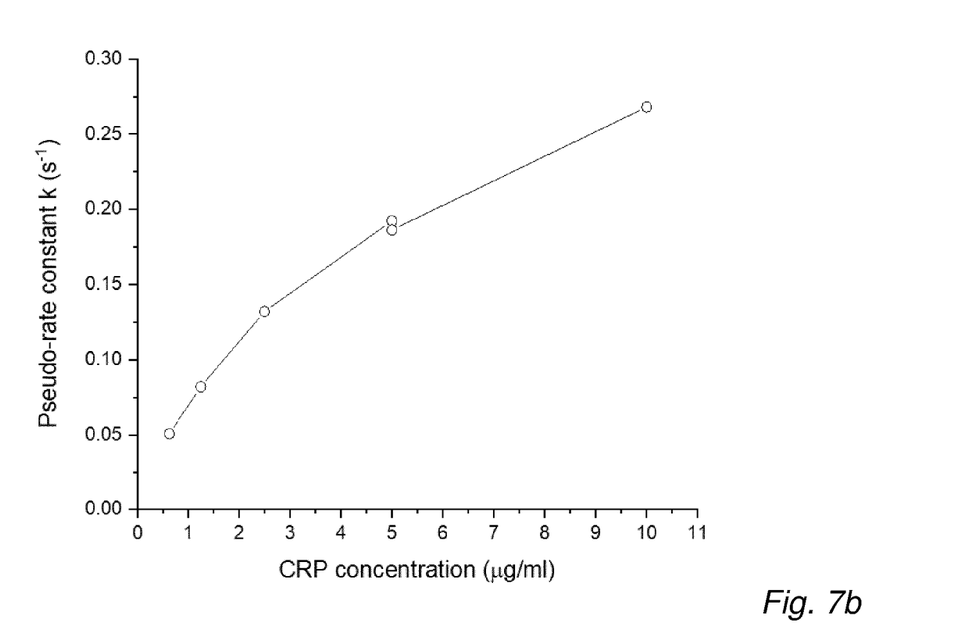
FIG. 7b illustrates a relationship between pseudo-rate constants and analyte concentrations which is experimentally determined from different samples of known concentration.

This approach is further illustrated in FIG. 7a and FIG. 7b. In the example of FIG. 7a, a plurality of samples (here six samples) with known analyte concentrations have been provided to a microfluidic device, and for each sample a signal which is indicative of the binding of the analyte to the affinity probes has been temporally measured. This may be carried out as described above in connection to steps S02 and S04. Notably, in FIG. 7a, the reaction kinetics of the binding reaction becomes faster as the concentration increases. The so temporally measured signals are then analyzed in accordance with step S06 to determine a pseudo-rate constant. For example, an exponential function may be fitted to each of the temporally measured signals to derive the pseudo-rate constant. FIG. 7b shows the pseudo-rate constants determined for the temporally measured signals of FIG. 7a as circles. By interpolation of the measured pseudo-rate constants, i.e., the circles of FIG. 7b, the relationship between the pseudo-rate constant and the analyte concentration may be arrived at.

The embodiments herein are not limited to the above described examples. Various alternatives, modifications and equivalents may be used. Therefore, this disclosure should not be limited to the specific form set forth herein. This disclosure is limited only by the appended claims and other embodiments than the mentioned above are equally possible within the scope of the claims.

The invention claimed is:

1. A method of measuring analyte concentration in a sample, comprising:
providing the sample to a microfluidic channel, wherein a surface of the microfluidic channel is provided with affinity probes for binding the analyte to the surface,
temporally measuring a signal which is indicative of the binding of the analyte to the affinity probes,
analyzing the temporally measured signal to determine a pseudo-rate constant which is indicative of how fast the temporally measured signal changes with time, and
determining the analyte concentration in the sample by comparing the determined pseudo-rate constant to a predetermined relationship which relates pseudo-rate constants to analyte concentrations.

2. The method according to claim 1, wherein the affinity probes include at least one of antibodies, antigens, receptors, aptamers, nucleic acids, and molecularly imprinted polymers.

3. The method according to claim 1, wherein a surface sensitive technique is used to perform at least one of causing generation of the signal and collecting the signal.

4. The method according to claim 3, wherein an evanescent optical technique is used to perform at least one of causing generation of the signal and collecting the signal.

5. The method of claim 1, wherein a waveguide arranged adjacent to the surface is used to perform at least one of causing generation of the signal by subjecting the surface of the microfluidic channel to light carried by the waveguide and collecting the signal from the microfluidic channel.

6. The method according to claim 1, wherein the temporally measured signal is analyzed by fitting a parametric function to the temporally measured signal, wherein the pseudo-rate constant is determined as a parameter of the parametric function.

7. The method of claim 6, wherein the parametric function is an exponential function.

8. The method of claim 1, wherein the pseudo-rate constant is related to the analyte concentration according to the predetermined relationship.

9. The method according to claim 1, wherein the binding of the analyte to the surface is determined by a first order association reaction.

10. The method according to claim 9, wherein the pseudo-rate constant is related to a product of the analyte concentration and an association rate constant of the first order association reaction according to the predetermined relationship.

11. The method of claim 10, wherein the association rate constant is an effective association rate constant which takes into account mass transport effects or other rate-limiting effects.

12. The method according to claim 1, wherein the analyte concentration in the sample is sufficiently high to approach saturation of the affinity probes within a predetermined time from the providing of the sample.

13. The method of claim 1, wherein, if the analyte concentration in the sample is not sufficiently high to approach saturation of the affinity probes within a predetermined time from providing the sample, the method further comprises adding a spike of the analyte to the sample after the predetermined time, to saturate the affinity probes.

14. The method according to claim 1, wherein the signal originates from luminescence or colorimetry.

15. The method according to claim 1, wherein the signal is measured by using colorimetric or fluorescence techniques.

16. The method according to claim 1, wherein the predetermined curve is obtained through analyzing a temporal signal of a plurality of calibration samples, each with different and known analyte concentrations.

17. A system for measuring analyte concentration in a sample, comprising:
 a microfluidic device including a microfluidic channel arranged to receive the sample, wherein a surface of the microfluidic channel is provided with affinity probes for binding the analyte to the surface,
 a detector arranged to temporally measure a signal which is indicative of the binding of the analyte to the affinity probes, and
 a processing device arranged to:
 analyze the temporally measured signal to determine a pseudo-rate constant which is indicative of how fast the temporally measured signal changes with time, and
 determine the analyte concentration in the sample by comparing the determined pseudo-rate constant to a predetermined relationship which relates pseudo-rate constants to analyte concentrations.

18. The system of claim 17, wherein the detector is a surface sensitive detector.

19. The system according to claim 17, further comprising:
 a waveguide arranged adjacent to the surface of the microfluidic channel, the waveguide being arranged to perform at least one of causing generation of the signal by subjecting the surface of the microfluidic channel to light carried by the waveguide and collecting the signal from the microfluidic channel.

20. The system according to claim 17, wherein the microfluidic device is a microfluidic chip.

21. A diagnostic device comprising the system of claim 17.

* * * * *